June 13, 1933.                B. J. UKROPINA                 1,913,778
                            CONCRETE PIPE JOINT
                            Filed Dec. 1, 1930
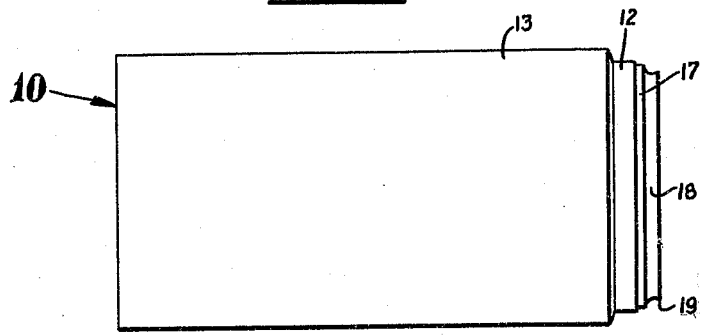
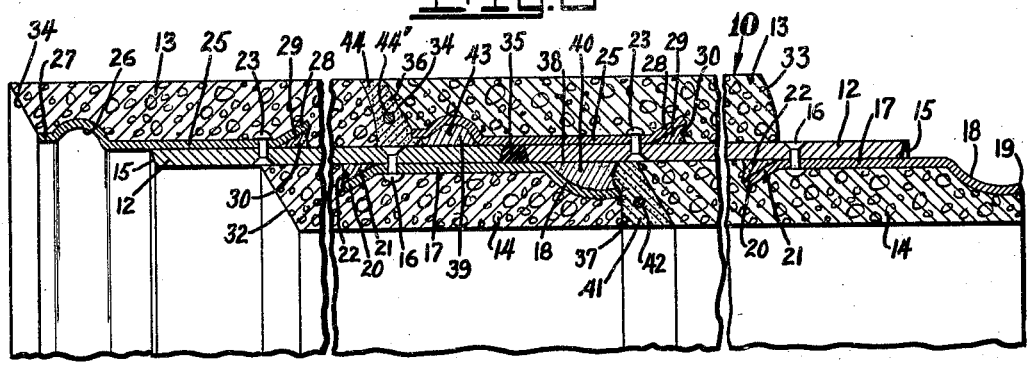
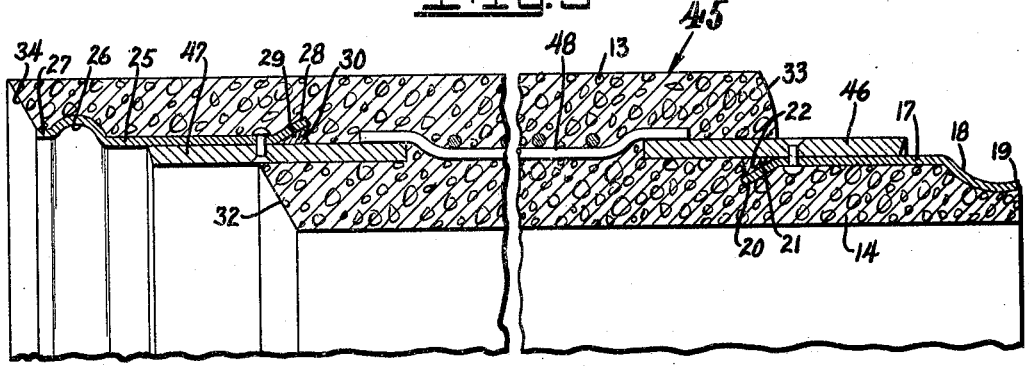
INVENTOR.
B. J. UKROPINA.
BY
ATTORNEY.

Patented June 13, 1933

1,913,778

UNITED STATES PATENT OFFICE

BOZIDAR J. UKROPINA, OF LOS ANGELES, CALIFORNIA

CONCRETE PIPE JOINT

Application filed December 1, 1930. Serial No. 499,232.

This invention relates to improvements in concrete pipes.

The general object of the invention is to provide an improved concrete pipe having a novel joint construction.

A further object of the invention is to provide a concrete pipe joint wherein the joint is made leak-proof by a novel means.

Other objects and advantages of this inventions will be apparent from the following description, taken in connection with the accompanying drawing wherein:

Fig. 1 is a side elevation of a concrete pipe embodying the features of my invention.

Fig. 2 is an enlarged fragmentary section through two lengths of pipe showing my improved joint construction, and Fig. 3 is an enlarged fragmentary section through a modified form of pipe.

Referring to the drawing by reference characters I have indicated a length of concrete pipe embodying the features of my invention generally at 10. As shown the pipe 10 includes a metal reinforcing tube 12. The tube 12 is embedded between an outer layer of concrete 13 and an inner layer of concrete 14. Each end of the tube 12 is beveled inwardly as at 15 and secured adjacent one end of the tube to the inner surface thereof by rivets 16 or by welding, I provide a metal spigot ring 17.

This spigot ring extends beyond the end of the tube 12 where it is provided with an inwardly bowed arcuate shoulder 18. The center of the radius of the arc of the shoulder 18 is set in from the outer end of the spigot ring so that the end flares slightly outward as at 10. The opposite or inner end of the spigot ring is inclined inwardly as indicated at 20 to provide a wedge-shaped chamber 21 in which packing material 22 is positioned. This packing material may be lead or asphaltum and is positioned in the chamber 21 before the metal tube 12 is embedded in the concrete, and when the inner layer of concrete 14 is moulded in position the concrete wedges the packing 22 tightly in the chamber 21, thereby forming a fluid tight seal between the tube 12 and the spigot ring 17.

Adjacent the opposite end of the tube 12 I secure to the outer surface thereof as by rivets 23 a metal bell ring 25 which is similar to the spigot ring 17. The bell ring 25 extends beyond the end of the tube 12 where it is provided with an annular inwardly facing groove 26 and a reduced end portion 27. The opposite or inner end of the bell ring 26 is inclined outwardly as indicated at 28 to form a wedge-shaped chamber 29 in which packing material 30 is positioned. The packing material 30 which, like the packing material 22, may be asphaltum or lead, is positioned in the chamber 29 before the tube 12 is embedded in the concrete and when the outer layer of concrete 14 is moulded in position it wedges the packing tightly in the chamber 29, thereby forming a fluid tight seal between the tube 12 and the bell ring 25.

At the end of the pipe opposite the spigot ring 17 the inner layer of concrete 14 is set back from the end of the tube 12 and beveled inwardly as indicated at 32, while at the end adjacent the spigot ring 17 it is straight and terminates flush with the outer end of the spigot ring. The end of the outer layer of concrete 13 adjacent the spigot ring 17 is set back from the end of the tube 12 and is outwardly beveled with an arcuate face as indicated at 33 while at the end adjacent the bell ring 25 it is outwardly beveled from the outer end of the bell ring as indicated at 34.

When two lengths of the pipe 10 are joined a resilient packing ring 35 such as rubber is positioned over the spigot ring 17 adjacent the beveled end 15 of the tube 12. The spigot end of one pipe is then inserted in the bell end of the adjoining pipe so that the projecting portion of the spigot ring is positioned inside of the tube 12 of the adjoining pipe and the bell ring 25 of the adjoining pipe is positioned outside of the tube 12. The two pipe lengths are then forced together until the resilient packing ring 35 is compressed between the adjacent ends of the tubes 12 of the adjoining pipes.

When the pipe lengths are in this position a chamber 36 is formed between the adjacent ends of the outer layers of concrete 13 and a chamber 37 is formed between the adjacent ends of the inner layers of concrete 14. Furthermore, a wedge-shaped chamber 38 is formed between the inner surfaces of the tube 12 and the outer surface of the spigot ring 17 and a chamber 39 is formed between the outer surface of the tube 12 and the inner surface of the groove 26 of the bell ring 25. A calking material 40 which may include lead is then driven in the chamber 38 and tightly packed therein to form a fluid tight seal between the spigot ring of one pipe length and the tube 12 of the adjacent pipe length.

After the calking 40 has been positioned in the chamber 38 the chamber 37 is filled with a plastic material 41 such as asphaltum which may have a reinforcing member 42 embedded therein. A calking material 43 which may include lead is then driven into the chamber 39 and tightly packed therein to form a fluid tight seal between the bell ring 25 of one pipe length and the tube 12 of the adjoining pipe length. After the calking 43 is positioned in the chamber 39 the chamber 36 is filled with a plastic material 44 such as asphaltum which may have a reinforcing member 44' embedded therein. The chamber 36 which is formed between the end 34 of one pipe and the end 33 of the other pipe is of less width on the outside of the pipes than it is adjacent the reinforcing tube 12. Thus after the material 44 such as asphaltum sets it will not accidentally fall out even though it should crack.

In Fig. 3 I have shown a section of concrete pipe 45 embodying the features of my invention which is constructed similar to the pipe 10 except that the metal tube 12 instead of continuing the full length of the pipe comprises end sections 46 and 47 shown as connected by a wire reinforcing cage 48 which is secured to the end sections by welding. The pipe sections 45 are otherwise made and put together in the same manner described in connection with the pipe 10.

It will be noted that my joint allows for expansion and contraction without liability of leakage so that concrete pipe embodying my invention may be used for many purposes, and from the foregoing description it will be apparent that I have provided an improved concrete pipe and pipe joint which can be economically manufactured and which is simple in construction and highly efficient in use.

Having thus described my invention, I claim:

1. A moulded pipe, said pipe including a metal reinforcing member embedded between an outer layer of moulded material and an inner layer of moulded material, a spigot ring secured adjacent one end of said reinforcing member to the inner surface thereof, said spigot ring extending beyond the end of said reinforcing member, said extended portion including an inwardly inclined shoulder and a reduced end portion, means adjacent the opposite end of said spigot ring to form a fluid tight seal between said reinforcing member and said spigot ring, a bell ring secured to the outer surface of said reinforcing member adjacent the end of said reinforcing member opposite said spigot ring, said bell ring extending beyond the end of said reinforcing member and said extended portion including an annular groove and a reduced end portion, means adjacent the opposite end of said bell ring to form a fluid tight seal between said bell ring and said reinforcing member, the end of said inner layer of concrete opposite said spigot ring being set back from the end of said reinforcing member and the end of said inner layer of concrete adjacent said spigot ring terminating adjacent the outer end of said spigot ring, the end of said outer layer of concrete adjacent said spigot being set back from the end of said reinforcing member and the opposite end of said outer layer of concrete terminating adjacent the outer end of said bell ring.

2. A concrete pipe, said pipe including a metal reinforcing tube embedded between an outer layer of concrete and an inner layer of concrete, the ends of said tube being beveled inwardly, a spigot ring secured adjacent one end of said tube to the inner surface thereof, said spigot ring extending beyond the end of said tube and said extended portion including an inwardly inclined shoulder and a reduced end portion, the opposite end of said spigot ring being inwardly inclined to form a wedge shaped chamber between the inner surface of said tube and said ring, packing material in said chamber to form a fluid tight seal between said tube and said spigot ring, a bell ring secured to the outer surface of said tube adjacent the end of said tube opposite said spigot ring, said bell ring extending beyond the end of said tube and said extended portion including an annular groove and a reduced end portion, the opposite end of said bell ring being outwardly inclined to form a wedge-shaped chamber between the outer surface of said tube and said ring, packing material in said chamber to form a fluid tight seal between said bell ring and said tube, the end of said inner layer of concrete opposite said spigot ring being set back from the end of said tube and being inwardly beveled and the end of said inner layer of concrete adjacent said spigot ring terminating adjacent the outer end of said spigot ring, the end of said outer layer of concrete adjacent said spigot ring being set back from the end of said tube and the opposite end of said outer layer of concrete terminating adjacent the outer end of said bell ring.

3. In a fluid conduit comprising a plurality of lengths of pipe, each of said pipes including a reinforcing tube exposed at both ends with the exposed ends of said tube inwardly beveled, each reinforcing tube being embedded between an outer layer of moulded material and an inner layer of moulded material, a spigot ring secured adjacent one end of each of said tubes to the inner surface thereof and extending therebeyond, the extending portions of said spigot rings including an inwardly inclined shoulder and a reduced tapered end portion, means adjacent the inner ends of said spigot rings to form a fluid tight seal between said rings and the tubes to which they are secured, a bell ring secured on the outer surface of said tubes adjacent the end thereof opposite said spigot ring and extending beyond the end of said tube, the extending portions of said bell rings including an inwardly facing annular groove and a reduced end portion, means adjacent the inner ends of said bell rings to form a fluid tight seal between said bell rings and the tubes to which they are secured, said spigot ring of one pipe length being positioned within the reinforcing tube of the adjacent pipe length and said bell ring of one pipe length being positioned over the reinforcing tube of the adjacent pipe section, a resilient packing member surrounding said spigot rings, said packing members being engaged by the adjacent ends of adjoining tube sections and compressed therebetween, the adjacent ends of said outer layers of moulded material forming a chamber at each joint and the adjacent ends of said inner layers of moulded material forming a chamber at each joint, said inwardly inclined shoulder and said tapered reduced end portion of said spigot rings forming a chamber between the inner surface of the tube of the adjoining pipe length, said groove in said bell rings forming a chamber between the outer surface of the tube of the adjoining tube section, a calking material in said spigot ring chamber and a calking material in said bell ring chamber, said first and second chambers being filled with a plastic material and a reinforcing member in said plastic material.

4. A moulded pipe, said pipe including a metal reinforcing member embedded between an outer layer of moulded material and an inner layer of moulded material, a spigot ring secured adjacent one end of said reinforcing member to the inner surface thereof, said spigot ring extending beyond the end of said reinforcing member, said extended portion including an inwardly inclined portion, means to form a fluid tight seal between said reinforcing member and said spigot ring, a bell ring secured to the outer surface of said reinforcing member adjacent the end of said reinforcing member opposite said spigot ring, said bell ring extending beyond the end of said reinforcing member and said extended portion including a flared end portion, means to form a fluid tight seal between said bell ring and said reinforcing member, the end of said inner layer of concrete opposite said spigot ring being set back from the end of said reinforcing member and the end of said inner layer of concrete adjacent said spigot ring terminating adjacent the outer end of said spigot ring, the end of said outer layer of concrete adjacent said spigot being set back from the end of said reinforcing member and the opposite end of said outer layer of concrete terminating adjacent the outer end of said bell ring.

5. A conduit comprising a plurality of lengths of concrete pipe, each of said lengths including a metal reinforcing tube embedded between an outer layer of concrete and an inner layer of concrete, a spigot ring secured adjacent one end of said tube to the inner surface thereof, said spigot ring extending beyond the end of said tube and said extended portion including a reduced end portion forming a chamber with the inner surface of said tube as one wall thereof, a bell ring secured to the outer surface of said tube adjacent the end of said tube opposite said spigot ring, said bell ring extending beyond the end of said tube and said extended portion including a flared end portion forming a chamber with the outer surface of said tube as one wall thereof, the end of said inner layer of concrete opposite said spigot ring being set back from the end of said tube and the end of said inner layer of concrete adjacent said spigot ring terminating adjacent the outer end of said spigot ring, the end of said outer layer of concrete adjacent said spigot ring being set back from the end of said tube and the opposite end of said outer layer of concrete terminating adjacent the outer end of said bell ring and a leak preventing filling tamped into said chambers, said set back portion forming grooves whereby said fillings can be tamped.

In testimony whereof, I hereunto affix my signature.

BOZIDAR J. UKROPINA.